No. 817,248. PATENTED APR. 10, 1906.
E. H. JACOX.
WIRE REELING TRUCK.
APPLICATION FILED OCT. 31, 1905.
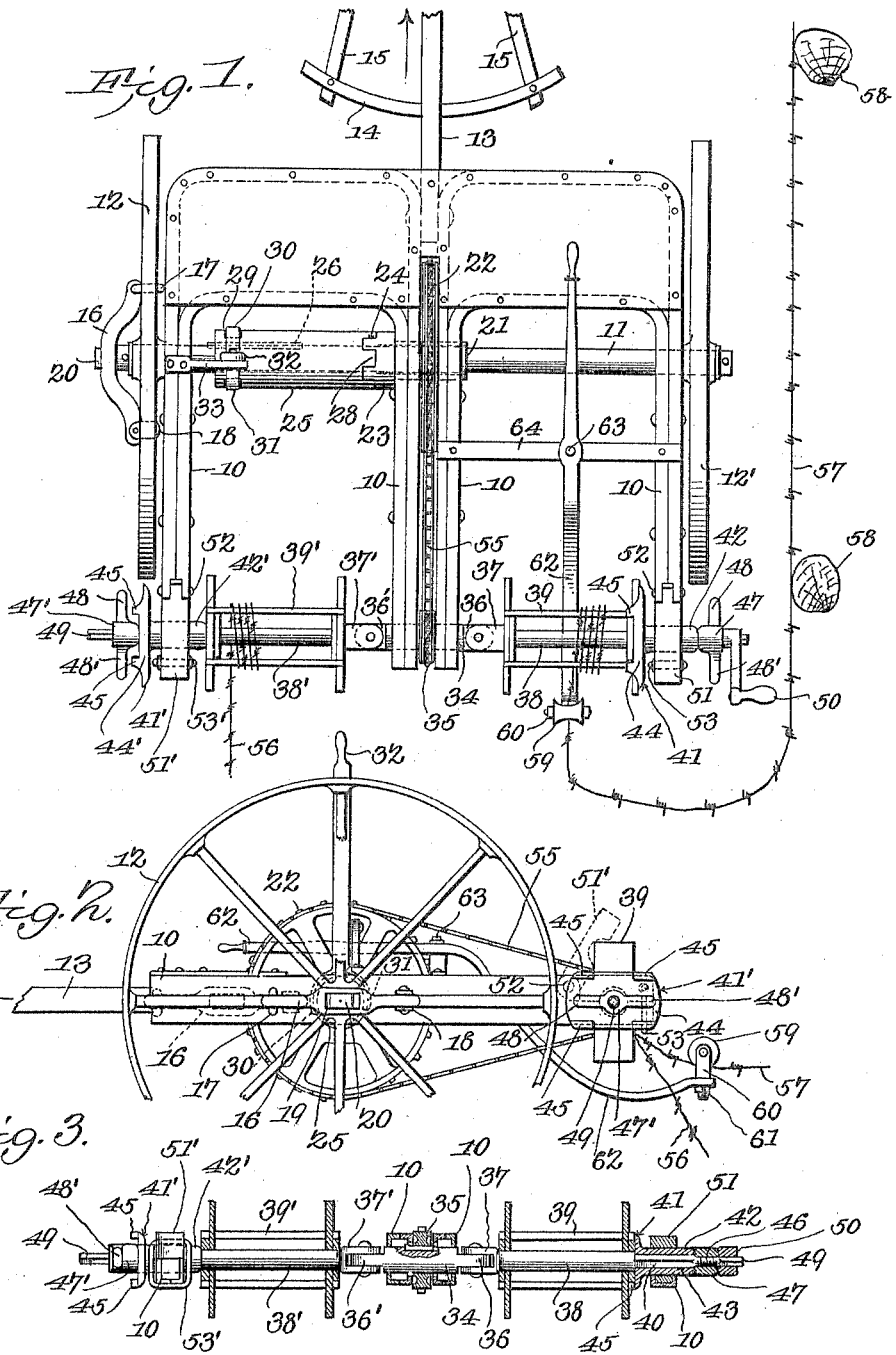
Witnesses
Edward H. Jacox, Inventor.
by C. A. Snow & Co.
Attorneys

UNITED STATES PATENT OFFICE.

EDWARD H. JACOX, OF BASSETT, NEBRASKA.

WIRE-REELING TRUCK.

No. 817,248.  Specification of Letters Patent.  Patented April 10, 1906.

Application filed October 31, 1905. Serial No. 285,263.

*To all whom it may concern:*

Be it known that I, EDWARD H. JACOX, a citizen of the United States, residing at Bassett, in the county of Rock and State of Nebraska, have invented a new and useful Wire-Reeling Truck, of which the following is a specification.

This invention relates to wire-reeling trucks, and has for an object to provide a device of the class embodying new and improved features of utility, economy, and efficiency.

A further object of the invention is to provide a reeling-truck embodying improved means for unwinding a wire from a spool and at the same time to take up another wire and wind it upon another spool.

A further object of the invention is to provide a wire-reeling truck embodying improved means whereby the reeling may be temporarily suspended if the wire is being wound too fast and with improved means for guiding the wire to and upon the spool to produce an even and compactly-filled spool.

A further object of the invention is to provide improved means whereby the filled and empty spools may be conveniently taken from and placed upon the winding-spindles of the truck.

With these and other objects in view the present invention consists in the combination and arrangement of parts, as will be hereinafter fully described, shown in the accompanying drawings, and particularly pointed out in the appended claims, it being understood that changes in the form, proportion, size, and minor details may be made without departing from the spirit or sacrificing any of the advantages of this invention.

In the drawings, Figure 1 is a top plan view of the improved wire-winding truck. Fig. 2 is a view of the truck in end elevation. Fig. 3 is a rear view of the winding spindles and spools partly in section.

Like characters of reference indicate corresponding parts in all of the figures of the drawings.

In its preferred embodiment the improved wire-reeling truck comprises a frame 10, having an axle 11 rotatably mounted therein and carried upon wheels 12 12', rotatably mounted upon the axle. For operation the frame is provided at its forward end with a reach 13, proportioned and arranged to be pivotally connected with the front axle of a wagon and its associated parts represented by the sway-bar 14 and hounds 15.

Upon one wheel, as 12, a yoke 16 is mounted, as by the link 17, embracing a spoke and slidably movable thereon and with a clasp, as 18, at the opposite end proportioned to clasp a spoke opposite that upon which it is mounted, as in Figs. 1 and 2, or to clasp the same spoke when the yoke is moved in the position shown in outline in Fig. 2. Intermediate its ends the yoke is provided with a mortise 19, proportioned to fit over and engage the squared or flattened end 20 of the axle.

Midway of the axle is rotatably mounted a sleeve 21, carrying rigidly the sprocket-wheel 22, retained between the middle frame-sections, and at one side the clutch member 23, provided with the recesses 24. Upon the axle is also mounted the clutch-sleeve 25, longitudinally movable, but held against rotary displacement by a key 26, carried rigidly by the axle. The clutch is provided with offsets 28, proportioned to engage within the recesses 24 and to rotate the sleeve 21 and sprocket 22. The clutch-sleeve 25 is provided at the end opposite the offsets 28 with an annular groove 29, engaged by the fingers 30 and 31, carried by the lever 32, which is pivoted in any convenient structure, as the cross-piece 33.

At the rearward end of the center frame-pieces is journaled the trunnion 34, with a sprocket-wheel 35 rigidly carried thereon and retained from longitudinal displacement between the frame-pieces. At each end, as at 36 36', the trunnion is squared to receive the hinge portions 37 37' of the spool-spindles, which form shoulders beyond which extend the round rods 38 38', proportioned to receive the wire-spools 39 39'. Beyond the round portion the spindles are squared, as at 40, to receive the spool-engaging members 41 41'. The engaging members comprise sleeves 42 42', having the squared opening 43 proportioned to fit upon the squared portion of the spindle, and a plate-like portion 44 44', having lugs, as 45, to engage opposite sides of the end pieces of the spools. Beyond the squared sections 40 the spindles are continued by the screw-threaded sections 46, upon which are disposed the tightening members 47 47', having cross-arms 48 48' and bearing against and clamping the engaging members 41 41' in contact with the spools. Beyond the screw-threaded sections 46 the spindle is again squared, as at 49, to receive a crank-arm, as 50, by means of which the spindles and spools may be rotated manually when occasion makes such operation desirable. The rearward ends of the side bars of the frame are provided with blocks 51 51', hinged in any approved manner, as at 52, and held in position by the bails 53 53'. The frame-piece and the block are each provided with a semicircular concave, together forming the bearing-openings within which are journaled the sleeves 42 42', forming the bearing within which are rotated the spool-spindles by the chain 55, from the sprocket 22 to the sprocket 35. The spool-engaging members may be placed upon the spindle with either end in contact with the spool, and when disposed as at 41' the spool 39' is not held against rotation, so that it may be rotated in either direction by the unwinding of the wire 56 irrespective of the direction in which the spindle may be rotating. With the spool-engaging member positioned as at 41 the spool is rotated with the spindle, so that the wire 57 may be reeled up from its position adjacent the posts 58, from which it has been disconnected.

To wind the wire 57 evenly and compactly upon the spool 39, it is led over an idler 59, journaled between the arms of a U-shaped yoke 60, pivotally secured, as at 61, to a lever 62, pivoted, as at 63, to a cross-piece 64.

In operation two wires may be unwound simultaneously by mounting two filled spools upon the two spindles as the spool 39' is mounted. For unwinding the wire the clutch may be disengaged and the spools permitted to roll under the tension of the wire.

To reel a wire, the wire is first disconnected from the posts and dropped upon the ground. The reeling-truck is then driven in the direction indicated by the arrow and the end of the wire passed over the idler 59 and connected to the spool. Any desired slack may be reeled onto the spool by means of the crank 50, after which the clutch is thrown into engagement and the truck driven along adjacent the row of posts. As the spool winds the wire the lever 62 is moved from side to side by a person upon the platform to guide the wire properly thereon. As the spool fills and the circumference becomes greater the wire will be wound faster, and if the backwardly-extending loop becomes too short the clutch may be disengaged to allow the spools to stop rotating for a short space of time. The clutch may also be disengaged for any other purpose, as when splice is encountered in the wire.

The pin upon which the idler 59 is mounted may be removable, so that the wire may the more easily be placed thereon.

When the device is to be moved from place to place, the yoke 16 may be disengaged from the end of the axle and slidably moved to the dotted positions shown in Fig. 2, where it may be clasped upon the spoke and the wheel be free to rotate upon the axle.

By use of the yoke 16 the device may be marketed without wheels, and any convenient wheels, as those from a wagon, hay-rake, cultivator, or other implement may be used thereon.

Having thus described the invention, what is claimed is—

1. A wire-reeling truck embodying, a frame, an axle mounted to rotate in the frame, supporting-wheels arranged to operate the axle, a trunnion journaled in the frame, means to rotate the trunnion from the axle, a spindle hinged to the trunnion and rotatable therewith, and means to secure a spool removably upon the spindle.

2. A wire-reeling truck embodying, a frame, a sprocket provided with trunnions journaled in the frame, means to drive the sprocket from the truck-wheels, a separable bearing carried by the frame, a spindle hinged to and carried at one end by the trunnion and journaled in the separable bearing, a spool-engaging member mounted upon and rotatable with the spindle and means to clamp the spool-engaging member upon a spool.

3. In a wire-reeling truck the combination with a trunnion, and mechanism for rotating the trunnion, of a spindle hinged to the trunnion, a spool removably mounted on the trunnion, and means for holding the spindle and trunnion normally in alinement.

In testimony that I claim the foregoing as my own I have hereto affixed my signature in the presence of two witnesses.

EDWARD H. JACOX.

Witnesses:
P. H. DAVIS,
E. OLSON.